United States Patent Office 3,156,755
Patented Nov. 10, 1964

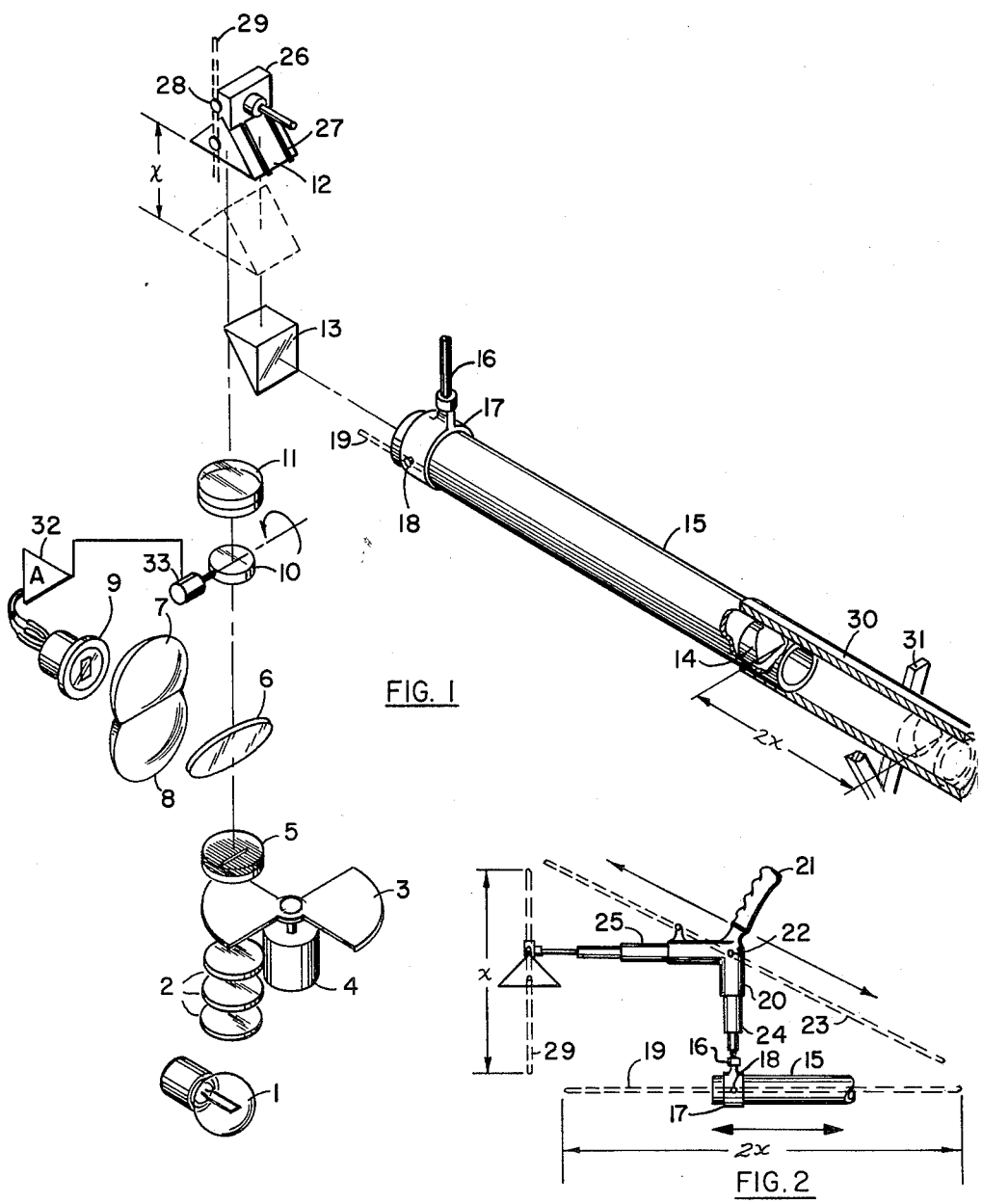

3,156,755
OPTICAL INSTRUMENT FOR MEASURING ELE-
MENTAL SURFACE DISPLACEMENTS
Philip Wardham Collyer, Stamford, Conn., assignor to
Barnes Engineering Company, Stamford, Conn., a corporation of Delaware
Filed Mar. 29, 1961, Ser. No. 99,189
3 Claims. (Cl. 88—14)

This invention relates to a device for measuring displacements in a predetermined direction at right angles to a predetermined plane. An example of such measurement is the determination of straightness of cylinders such as rifle barrels.

There is a problem presented in the precise measurement of displacements along a direction at right angles to a predetermined plane. These displacements are associated with surfaces and the predetermined plane as will be described more fully below in a plane in which a line in an optical element is successively imaged.

One problem solved by the instrument of the present invention is the straightness of a cylinder such as a rifle barrel. Another problem is presented by displacements resulting from the departure of certain portions of a plane surface from planarity. A third application is a measurement of two surfaces which meet along a line. The measurements may be external where two surfaces are of an extended triangular shaped article or internal when they form the sides of a groove. The measurement may be either of displacements due to lack of straightness of the edge or to lack of parallelism of the edges to the predetermined plane referred to above.

In the past the problem of determining straightness of cylinders such as rifle barrels has been effected by an instrument in which a projected plane beam of light from a slit is reflected from a retroreflector or similar totally reflecting element in a fixed measuring plug. The retroreflector is in the form of a totally reflecting prism having a sharp edge parallel to the plane beam of light. The beam is reflected from the retroreflector back to a detector. The device is in the form of a null instrument and indicates translational motions of the reflected beam due to movements of the retroreflector at right angles to the plane of the light beam. The whole instrument is fixed and measurements of rifle barrel straightness are effected by moving the barrel along the plug containing the retroreflector. Useful measurements are obtained but the device is ill-suited for practical operation because the rifle barrel has to be moved over it which precludes simple rigid mounts therefor and which makes straightening of the barrel mechanically a difficult problem. The device also lacks flexibility as it is not useful for measuring other displacements associated with planes of different configuration as has been referred to above. The present invention is a flexible instrument which measures displacements regardless of the nature of the surface and which is also capable of performing the function of measuring straightness of a rifle barrel in a better manner than was done before.

Essentially the present invention involves a number of elements which are connected in optical alignment. First, there is a differential detector system with a sharp line of detection discontinuity. The line is imaged by the optics of the instrument into various positions which lie in a plane. At the same time a retroreflector, which may be of the same design as in the old rifle barrel straightening plugs, is moved along the surface whose straightness or parallelism to the predetermined plane is to be measured. The retroreflector includes an edge between retro-reflecting surfaces. A source of illumination is also provided which by means of suitable beam splitters, passes through the optics above referred to and encounters the retroreflector. On reflection the edge of the retroreflector is imaged on a plane containing the line in the detector element and displacements of the retroreflector at right angles to the plane of successive line image motion causes the detector to emit a signal which is a measure of the displacements of the retroreflector. Finally the optics contain movable elements which permit motion of the retroreflector while automatically at the same time maintaining a constant path length between the line in the detector and the retroreflector edge. This permits the retroreflector to be moved in and out of cylinders such as gun barrels or along surfaces permitting many types of displacement measurements with maximum precision.

Another advantage of the present invention is that it is singularly free from the effects of a number of types of motion of its constituent optical elements producing an extremely versatile instrument and one which is relatively unaffected by environmental conditions.

The image of the detector line and of the retroreflector edge display a wide range of invariance with movement. Any object such as the line of the detector discontinuity, the position of its image, which though an optical phenomenon possesses the same properties as a physical object, and finally the retroreflector with its sharp reflecting edge are capable of six forms of movement which may be considered as six degrees of freedom. These degrees of freedom or possible motions are three translational motions along each of three orthogonal axes and three rotations about the same axes. As the line of detection discontinuity in the detector responds to only one motion, namely translation at right angles thereto in the plane of the detector surface, the instrument is insensitive to motions in the other five directions, provided, of course, that the motion is not so great as to bring it out of the field of view of the detector. Four of these five motions merely affect relative energy and therefore sensitivity, and the fifth motion (translational) only affects focus and hence sharpness of image.

Turning now to the image of the detector discontinuity line in space at positions near positions of the retroreflector the motion of successive images of the line would usually be in a straight line in most instruments. However, this is by no means necessary so long as the motions remain in one plane and this plane will be referred to throughout the specification and claims as the "optical measuring plane." This expression will be used in no other sense.

The motions of the edge of the retroreflector are also normally in a plane which is parallel to the optical measuring plane and in the preferred apparatus coincides therewith. The retroreflector is, however, capable of translational movements at right angles to the optical measuring plane. When this occurs if the retroreflector is properly illuminated as will be described below, an image will be reflected back onto the detector in the plane of the line of discontinuity and relative displacements of the image will produce detector signals.

What has been said with respect to the five degrees of freedom other than one particular translational displacement of an image at right angles to the detector line of discontinuity applies to the image of the line and to the line of the retroreflector. One of these motions is the movement of the retroreflector in a plane parallel to the optical measuring plane. This, of course, results in no change at all as the optics maintain the path length to the detector line constant. Similarly translational motions along the line of discontinuity also have no effect. Only motions at right angles thereto are measured.

It has been mentioned before that a beam of radiation is reflected from the retroreflector. It is an advantage of the present invention that the nature of this beam does not adversely affect the measurement. The best shape of beam is one in which the beam is centered on the image of the line of detector discontinuity at the edge of the retroreflector and has relatively small dimensions at right angles to the edge. Such a beam may be produced by a single small hole, a series of holes arranged in a line of proper orientation or by a slit. While such beams are preferred because they give maximum accuracy and sensitivity other shapes of beams are equally useful as far as the theoretical functioning of the machine is concerned. Thus the beam may be a round beam from a relatively large opening and it need not be centered on the image of the detector line of discontinuity. There will still be a measurement of displacement of the retroreflector from the plane of optical measurement. However, the sensitivity of the instrument will be reduced somewhat.

It will appear from the above general optical discussion that while it is preferred to have the image of the line of detector discontinuity coincide with the edge of the retroreflector in ordinary position and be illuminated by a small spot, series of spots or line of light parallel to and coinciding with said image, this is not necessary to the operation of the instrument. Normally, of course, the instrument will be made with a reasonable approximation of the above conditions because it is just as easy to design the optics and the light source to conform approximately with optimum conditions as it is to design them otherwise. However, the great ranges of movement or displacement of the three elements referred to above without destroying the operation of the instrument as a measuring device permit continued usefulness even though there may have been some departure from initial alignment and also makes construction far less critical. This is a very real advantage though, of course, it is undesirable to carry the possibilities to an extreme. After all the present invention represents an instrument capable of extraordinary precision and there is a great advantage in using normal standards for precision instrument manufacture. However, no abnormal standards are necessary and usefulness remains even if alignment varies somewhat in use.

The retroreflector has been referred to as having a sharp edge. It may take many physical forms. Among the best is an internally totally reflecting prism. However, any other arrangements of reflecting surfaces may be used such as mirror surfaces which meet along an edge. The prism presents advantages in ruggedness and simplicity and is not unduly expensive to produce. It is, therefore, preferred and will be specifically described. The description will be of a typical form of instrument for the use in measuring departures from straightness of a cylinder such as a rifle barrel. This is one form only but it is typical and represents an important practical field of usefulness for the present invention.

The invention will be described in greater detail in conjunction with the drawings in which:

FIG. 1 is an isometric view, partly broken away, of the instrument, and

FIG. 2 is a detail of the automatic special alignment.

In the instrument a source of light 1 is imaged by the lenses 2 onto a slit 5. For clarity the optical portion of the instrument is shown largely diagrammatically. Between the lenses and the slit is a chopper 3, driven by a motor 4, which interrupts the light beam at a predetermined chopping frequency. Pulsating light from the slit then passes through a beam splitter 6, a rotatable adjustable plate 10 and is imaged by an objective 11 onto a totally reflecting prism 14. The beam is twice reflected, first by a movable prism 12 and then by a stationary prism 13, and passes through a movable tube 15 which carries the prism 14. This tube is capable of movement into and out of a tube to be measured, such as a gun barrel 30 supported in a fixed support 31. If everything is aligned the image of the slit is reflected back by the prism 14 through prisms 13 and 12 and is then reflected from the beam splitter 6 onto two field lenses 7 and 8 which are joined along a sharp median line which is the line of discontinuity referred to above. Back of the lenses is a suitable detector for optical radiation 9.

The tube 15 is moved in or out of the gun barrel and is held in alignment by means of a pin 18 which moves in a guiding slot 19. The guiding slot is in an element which does not change its orientation with respect to the instrument. It may be in a portion of the instrument itself or in the rifle barrel holder which is maintained in a fixed orientation to the instrument. For clarity in the drawing, this guiding slot is shown in dashed lines in semi-diagrammatic form as the case with others which will be described later. The pin 18 is located in a band 17 which clamps the tube 15 and which carries a rod 16 telescoping into a sleeve 24 as will be described below in connection with FIG. 2. FIG. 2 shows the telescoping arm 24 connecting the tube 15 with an L-shaped member 20 provided with a handle 21 and a pin 22 which moves in a slot 23 which is at an angle to the slot 19. The slot 23 as is the case with the slots 19 and 29 is maintained at a fixed orientation with respect to the instrument and may either be a part thereof or in a structure at fixed orientation therewith. The other end of the member 20 is also provided with a telescopic connection 25 which connects to a frame 26 with mounting projections 27 in which the movable prism 12 is mounted. This frame is provided with a pin 28 which moves in a third slot 29.

As the tube 15 is moved into the barrel the prism 12 is moved down at half the rate so that the optical path from the slit 5 to the reflecting prism 14 remains constant. The movement is shown by the distances $x$ and $2x$ on the drawings and the prism 12 is shown in dashed lines in the position of maximum extension of the tube 15. In a similar manner the total reflecting prism 14 is likewise shown in dashed lines.

In operation with a perfectly straight barrel the optical system is aligned by small movements of the correcting plate 10 so that the image of the slit 5 after being reflected back from the prism 14 strikes the dividing line of the two field lenses 7 and 8. Its flange then is equally divided onto both sides of the detector 9 which sides are connected into a bridge circuit in conventional manner. If the barrel is perfectly straight there will be no displacement vertically of the prism 14 as the tube 15 is slid into the barrel and hence the image of the slit 5 remains on the dividing line between the field lenses 7 and 8. If, however, there is any vertical departure from straightness the prism 14 is moved up or down which causes the image of the slit to move from its central position on the field lenses. The two sides of the detector then receive different illumination and a differential signal is produced which measures any departure from straightness of the barrel with extreme accuracy. The signal from the detector is amplified in conventional circuits (not shown), and an output signal of 0.01 volt per 0.001″ displacement of the prism 14 is easily obtained.

The error signal is amplified in an amplifier 32 of conventional design the output of which drives motor 33 which turns the correcting plate 10 until the reflected image of the slit once more is centered on the dividing line of the two field lenses 7 and 8. The amount by which the servo mechanism turns the correcting plate is a measure of the displacement of the totally reflecting prism 14.

The use of a servo link makes for maximum accuracy and produces a null instrument. However, if precise measurement of the displacement of the prism 14 is not essential and it is sufficient if a warning signal is produced showing that there is displacement and its direction the servo mechanism may be omitted and the detector output actuates a conventional meter or other display mechanism.

When the barrel has been measured by moving the tube 15 in and out the barrel can then be turned 90° and a second measurement made which will give an accurate indication of any departure from straightness in a direction of right angles to the first measurement. Ordinarily this is all that is necessary.

Optical measuring devices for barrel straightness have been used as has been described above and it is customary when it is desired to actually straighten the barrel to connect the error signals obtained through suitable servo mechanisms which drive elements to straighten the barrel. As these mechanisms are well known and are not changed in the slightest in the present invention they are not shown. Another way of looking at it is that the present invention is concerned with the production of a precise error signal and not what is done with the error signal. Of course, if automatic straightening is desired the servo mechanism replaces the one illustrated as only one servo mechanism is needed at any one time. However, it is appropriate to point out that one of the advantages of the present invention is that it lends itself to a simpler construction or operation of a straightening machine. When a rifle barrel had to be moved over an optical measuring device as is done in the past complex mechanical supports were required. In the present case the support is stationary and makes for a very simple straightening machine and one of maximum accuracy.

Two prisms 12 and 13 have been illustrated in the drawings. The use of internal reflection is very efficient and preferred but, of course, essentially the prisms are merely reflecting the beam and can be replaced by mirrors.

A chopped light beam is used in the present invention and if the light source is operated from alternating current it is desirable to establish a chop frequency sufficiently different from the ordinary 60 cycle used on the lamp so that there is no danger of spurious A.C. signals at lamp operating frequency. For example, the rotational speed of the motor 4 may be chosen to chop the beam at 400 cycles per second.

The correcting plate 10 has been shown as movable about an axis parallel to the detector line of discontinuity represented by the edges where the two field lenses 7 and 8 meet. This is the preferred form but it should be realized that the correcting plate 10 just as the other movable elements is also capable of six degrees of freedom only one of which causes correction. However, while the exact alignment of the axis with the line of detection discontinuity is not required a close approximation thereto is desirable because wide departures, although they will not render the instrument inoperative, do reduce the precision of readout where a measure of the departure from straightness of the cylinder is desired, that is to say, when the instrument is not used purely as a null indicator.

The use of a line where two field lenses meet as the line of detector discontinuity presents many practical operating advantages. It is definitely preferred but the invention is in no sense limited thereto. Any other form of detector or rather detecting systems in which there is a definite line of a detector discontinuity is useful, for example, a detector having an extended face such as a barrier layer cell may be provided with an accurate narrow scratch across its center dividing it into equal detectors which can be connected in opposition. Such a detector system is quite useful but somewhat less versatile than the preferred field lens system described.

I claim:

1. An instrument for detecting minute displacements of surface elements in a predetermined direction at right angles to a predetermined optical measuring plane, comprising in combination and in optical alignment a radiation detection system having a stationary sharp line of detection discontinuity, (a) means for imaging said line in successive positions in space, the direction of movement of the successive images defining the predetermined optical measuring plane, a movable retroreflector having a sharp edge between reflecting surfaces, (b) means for moving the retroreflector in a direction approximately parallel to the optical measuring plane and along the surface the elemental displacement of which is to be measured, the retroreflector being capable of limited motion at right angles to said plane, (c) a source of illumination, means for producing a beam therefrom and for shaping said beam and means, including the imaging means of section (a), for directing said beam approximately parallel to the optical measuring plane and striking the retroreflector, (d) movable reflecting means mechanically connected to the retroreflector and moving therewith, said reflecting means being in the path of the beam to the retroreflector and the beam reflected therefrom, the mechanical connection moving the reflecting means in a direction and at a rate to maintain the optical path constant from said retroreflector to the line of detector system discontinuity, and (e) the beam directing means also imaging the beam shaping means into the line of detector discontinuity.

2. An instrument according to claim 1 comprising a rotatable optical correcting plate between the line of detector discontinuity and the image thereof in the optical measuring plane and means actuated from the output of the detector system for rotating said correcting plate in a direction to reduce detector output to zero.

3. An instrument according to claim 2 in which the axis about which the correcting plate turns is parallel to the line of detector discontinuity.

References Cited in the file of this patent
UNITED STATES PATENTS

| | | |
|---|---|---|
| 1,624,733 | Humbrecht | Apr. 12, 1927 |
| 2,536,718 | Brandon | Jan. 2, 1951 |
| 2,792,741 | Mazzon | May 21, 1957 |
| 2,864,280 | Keller et al. | Dec. 16, 1958 |
| 3,076,380 | Brockway | Feb. 5, 1963 |